(12) United States Patent
Ito et al.

(10) Patent No.: US 8,320,027 B2
(45) Date of Patent: Nov. 27, 2012

(54) IMAGE PROCESSING APPARATUS, DATA PROCESSING METHOD EXECUTED BY IMAGE PROCESSING APPARATUS, AND COMPUTER-READABLE STORAGE MEDIUM STORING PROGRAM FOR CAUSING COMPUTER TO EXECUTE DATA PROCESSING METHOD

(75) Inventors: Naoki Ito, Tokyo (JP); Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 12/719,670

(22) Filed: Mar. 8, 2010

(65) Prior Publication Data

US 2010/0231993 A1  Sep. 16, 2010

(30) Foreign Application Priority Data

Mar. 10, 2009  (JP) .................................. 2009-056316

(51) Int. Cl.
 *H04N 1/04* (2006.01)
(52) U.S. Cl. ........................ 358/474; 358/498; 358/488
(58) Field of Classification Search .................. 358/460, 358/488, 462, 453, 448, 505, 501, 1.17, 1.16
See application file for complete search history.

(56) References Cited

U.S. PATENT DOCUMENTS

| | | | | |
|---|---|---|---|---|
| 5,165,103 A | * | 11/1992 | Takeda et al. | 382/305 |
| 5,393,962 A | * | 2/1995 | Konishi et al. | 235/375 |
| 5,699,549 A | * | 12/1997 | Cho | 711/115 |
| 7,742,176 B2 | * | 6/2010 | Braunecker et al. | 356/614 |

FOREIGN PATENT DOCUMENTS

| | | |
|---|---|---|
| JP | 03-077182 A | 4/1991 |
| JP | 2005-328361 A | 11/2005 |
| JP | 2008-145611 A | 6/2008 |
| JP | 2008-276677 A | 11/2008 |

* cited by examiner

*Primary Examiner* — Negussie Worku
(74) *Attorney, Agent, or Firm* — Canon USA, Inc., IP Division

(57) ABSTRACT

An image processing apparatus capable of checking whether information is recorded in a predetermined region of a document and not recorded in another predetermined region, includes a first and second registration unit, an input unit configured to input image data obtained by reading an image of the document, an identification unit configured to identify a region corresponding to position information registered by the first registration unit or position information registered by the second registration unit from the image data input by the input unit, a determination unit configured to determine whether information is recorded in the region identified by the identification unit, and an output unit configured to output a result indicating that information is recorded in the first region or information is not recorded in the second region according to the determination by the determination unit.

10 Claims, 11 Drawing Sheets

FIG.2A

INVOICE

MONTH    DATE    YEAR
INVOICE NO.

COMPANY NAME

NAME

XXX CORPORATION
NAME:
ADDRESS: 11-11-11 ◯◯CHO, ◯◯-KU, TOKYO

Please remit the following to the account below.

TEL:      FAX:

| PROJECT DESCRIPTION | |
|---|---|
| TOTAL AMOUNT | YEN |

BANK FOR TRANSFER   BANK     BRANCH
No. ORDINARY ACCOUNT, CHECKING ACCOUNT No.

TERMS OF PAYMENT

| CODE | DESCRIPTION | QUANTITY | UNIT | UNIT PRICE | AMOUNT |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  | SUBTOTAL |
|  |  |  |  |  | CONSUMPTION TAX ETC. |
|  |  |  |  |  | TOTAL |

REMARKS

| SEAL | SEAL | SEAL |
|---|---|---|

XXX CORPORATION

FIG.2B

| INVOICE | |
|---|---|
| | MONTH DATE YEAR |
| | INVOICE NO. |
| COMPANY NAME | XXX CORPORATION |
| NAME | NAME: |
| Please remit the following to the account below. | ADDRESS: 11-11-11 ○○CHO, ○○-KU, TOKYO |
| | TEL: FAX: |

| PROJECT DESCRIPTION | | —31 |
| TOTAL AMOUNT | YEN | —32 |

BANK FOR TRANSFER BANK    BRANCH
No. ORDINARY ACCOUNT, CHECKING ACCOUNT No.
TERMS OF PAYMENT

| CODE | DESCRIPTION | QUANTITY | UNIT | UNIT PRICE | AMOUNT |
|---|---|---|---|---|---|
| | | | | | |
| | | | | SUBTOTAL | |
| | | | | CONSUMPTION TAX ETC. | |
| | | | | TOTAL | |

REMARKS

SEAL | SEAL | SEAL —33

XXX CORPORATION

FIG.2C

INVOICE

COMPANY NAME _____

NAME _____

Please remit the following to the account below.

MONTH    DATE    YEAR
INVOICE NO.

XXX CORPORATION
NAME:
ADDRESS: 11-11-11 ○○CHO, ○○-KU, TOKYO
TEL:         FAX:

| PROJECT DESCRIPTION | |
|---|---|
| TOTAL AMOUNT | *100,000,000* YEN |

— 41
— 42

BANK FOR TRANSFER  BANK         BRANCH
No. ORDINARY ACCOUNT, CHECKING ACCOUNT No.
TERMS OF PAYMENT

| CODE | DESCRIPTION | QUANTITY | UNIT | UNIT PRICE | AMOUNT |
|---|---|---|---|---|---|
| A1 | #$%& | 3 | CASE | 500,000 | 1,500,000 |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  | SUBTOTAL |  |
|  |  |  |  | CONSUMPTION TAX ETC. |  |
|  |  |  |  | TOTAL |  |

| REMARKS | |
|---|---|

| SEAL | SEAL | Ⓐ |
|---|---|---|

— 43

XXX CORPORATION

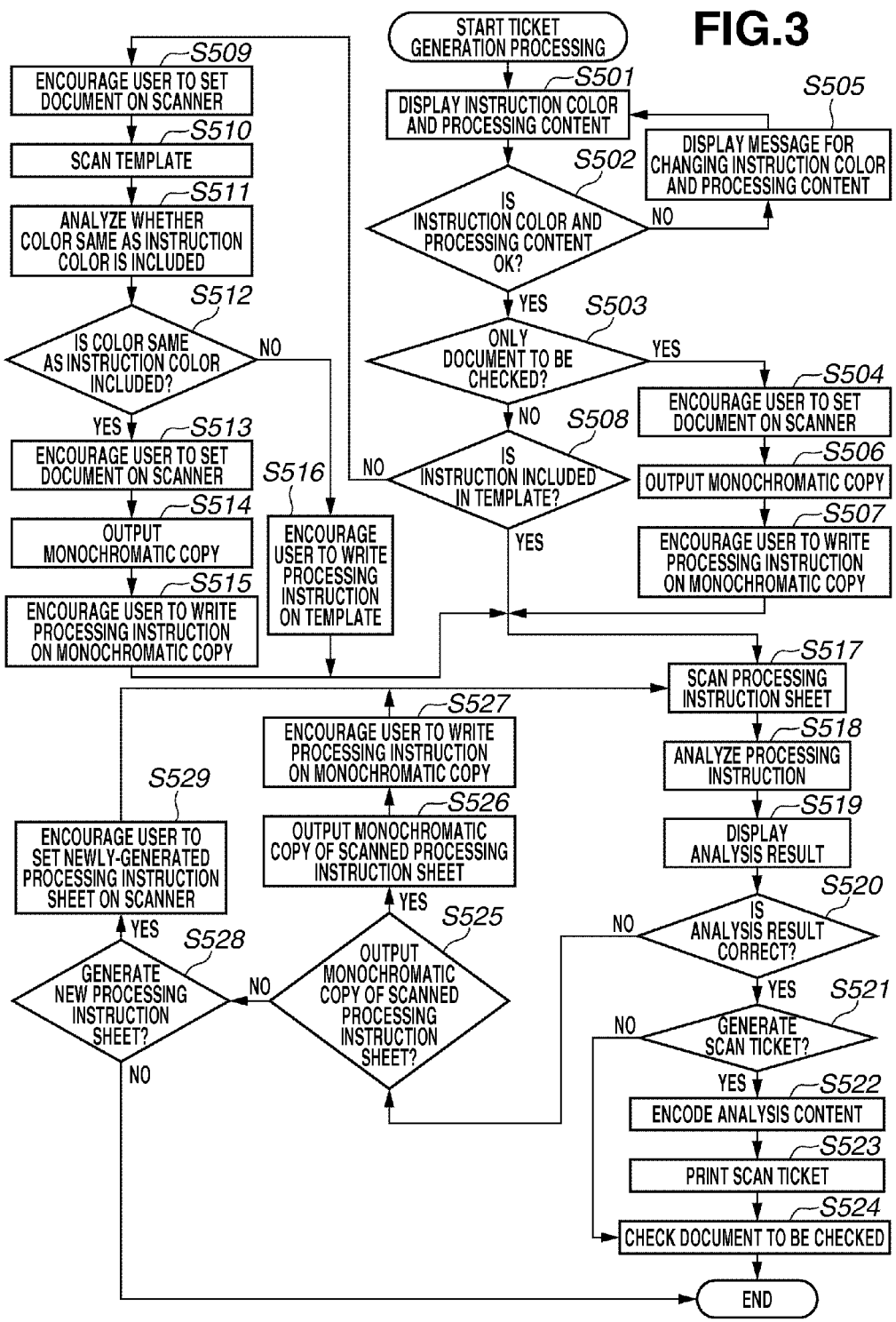

FIG.5A

```
CHECK RESULT

● NUMBER OF PAGES CHECKED: 100 PAGES
    ● NUMBER OF NG AREAS: 0
    ● TOTAL NUMBER OF NG PAGES: 0
    ● NG PAGE NO.: ―――

[ OK ]    [ REPORT PRINTING ]
```

FIG.5B

```
CHECK RESULT

● NUMBER OF PAGES CHECKED: 100 PAGES
    ● NUMBER OF NG AREAS: 3
    ● TOTAL NUMBER OF NG PAGES: 2
    ● NG PAGE NO.: 30, 50

[ OK ]    [ REPORT PRINTING ]    [ DISPLAY NG PAGE ]
```

FIG.5C

| CHECK RESULT | DISPLAY NG PAGE | |
|---|---|---|
| | [invoice image] | 1/2 NG PAGE No.: 1/2 |
| BACK | 30 PAGES | FORWARD |
| OK | REPORT PRINTING | |

FIG.6A

INVOICE

MONTH ○ DATE △ YEAR
INVOICE NO. *ooo/ooo11*

COMPANY NAME ○ ○ ○

NAME △ △

Please remit the following to the account below.

XXX CORPORATION
NAME:
ADDRESS: 11-11-11 ○○CHO, ○○-KU, TOKYO

TEL:        FAX:

| PROJECT DESCRIPTION | |
|---|---|
| TOTAL AMOUNT | *100,000,000* YEN |

BANK FOR TRANSFER  BANK        BRANCH
No. ORDINARY ACCOUNT, CHECKING ACCOUNT No.
TERMS OF PAYMENT

*NG PAGE*

| CODE | DESCRIPTION | QUANTITY | UNIT | UNIT PRICE | AMOUNT |
|---|---|---|---|---|---|
| *A1* | *####* | *3* | *CASE* | *500,000* | *1,500,000* |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  | SUBTOTAL |  |
|  |  |  |  | CONSUMPTION TAX ETC. |  |
|  |  |  |  | TOTAL |  |

| REMARKS | |
|---|---|

| SEAL | SEAL | SEAL |
|---|---|---|

XXX CORPORATION

FIG.6B

| INVOICE | |
|---|---|
| COMPANY NAME ○ ○ ○ | MONTH ○ DATE △ YEAR<br>INVOICE NO. ooo/ooo11 |
| NAME △ △ | XXX CORPORATION<br>NAME:<br>ADDRESS: 11-11-11 ○○CHO, ○○-KU, TOKYO |
| Please remit the following to the account below. | TEL:    FAX: |

| PROJECT DESCRIPTION | |
|---|---|
| TOTAL AMOUNT | 100,000,000 YEN |

BANK FOR TRANSFER        BANK        BRANCH
No. ORDINARY ACCOUNT, CHECKING ACCOUNT No.
TERMS OF PAYMENT

NG PAGE

| CODE | DESCRIPTION | QUANTITY | UNIT | UNIT PRICE | AMOUNT |
|---|---|---|---|---|---|
| A1 | ##### | 3 | CASE | 500,000 | 1,500,000 |
| | | | | | |
| | | | | | |
| | | | | | |
| | | | | | |
| | | | | | |
| | | | | | |
| | | | | SUBTOTAL | |
| | | | | CONSUMPTION TAX ETC. | |
| | | | | TOTAL | |

| REMARKS | |
|---|---|

NG

| SEAL | SEAL | SEAL |
|---|---|---|

XXX CORPORATION

IMAGE PROCESSING APPARATUS, DATA PROCESSING METHOD EXECUTED BY IMAGE PROCESSING APPARATUS, AND COMPUTER-READABLE STORAGE MEDIUM STORING PROGRAM FOR CAUSING COMPUTER TO EXECUTE DATA PROCESSING METHOD

BACKGROUND OF THE INVENTION

1. Field of the Invention

The present invention relates to an image processing apparatus configured to process image data obtained by scanning an image of a document.

2. Description of the Related Art

Conventionally, there is known a technique by which a document such as a ledger sheet is scanned by a scanner and a figure or a date included in the document is extracted. According to this technique, data extracted from a plurality of ledger sheets can be easily used in data processing such as tallying.

Japanese Patent Application Laid-Open No. 2008-145611 discusses a technique that identifies a region and content of a document to be processed. According to this technique, after a user manually writes processing instruction information including a region and content to be processed on a sheet of a document to be processed, the region and the content to be processed are scanned by a scanner and identified. Then, by using the generated processing instruction sheet, information which is added to the region of the document to be checked is extracted.

In offices where a large number of documents having the same form are processed, operators check documents according to visual inspection of whether a seal is affixed on a predetermined region and a different region is blank so as to determine and use it as an official document.

The technique discussed in Japanese Patent Application Laid-Open No. 2008-145611, however, only extracts information in a designated region and thus checking, as described above, is not easily performed.

SUMMARY OF THE INVENTION

The present invention is directed to an image processing apparatus capable of checking whether information is recorded in a predetermined region of a document and information is not recorded in another predetermined region of the document, a control method therefor, and a computer-readable storage medium.

According to an aspect of present invention, an image processing apparatus includes a first registration unit configured to register position information of a first region of a document and determined as normal if information is recorded, a second registration unit configured to register position information of a second region of the document and determined as normal if information is not recorded, an input unit configured to input image data obtained by controlling a reading unit to read an image of the document, an identification unit configured to identify a region corresponding to the position information registered by the first registration unit or the position information registered by the second registration unit from the image data input by the input unit, a determination unit configured to determine whether information is recorded in the region identified by the identification unit, and an output unit configured to output a result indicating that information is recorded in the first region or information is not recorded in the second region according to the determination by the determination unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B and 2C illustrate examples of a document to be processed according to the present embodiment.

FIG. 3 is a flowchart illustrating a generation process of a scan ticket according to the present embodiment.

FIGS. 5A, 5B and 5C are examples of a display screen used for displaying the document to be checked.

FIGS. 6A and 6B are examples of a printed document which is determined as NG.

DESCRIPTION OF THE EMBODIMENTS

Various exemplary embodiments, features, and aspects of the invention will be described in detail below with reference to the drawings.

Figure 1:
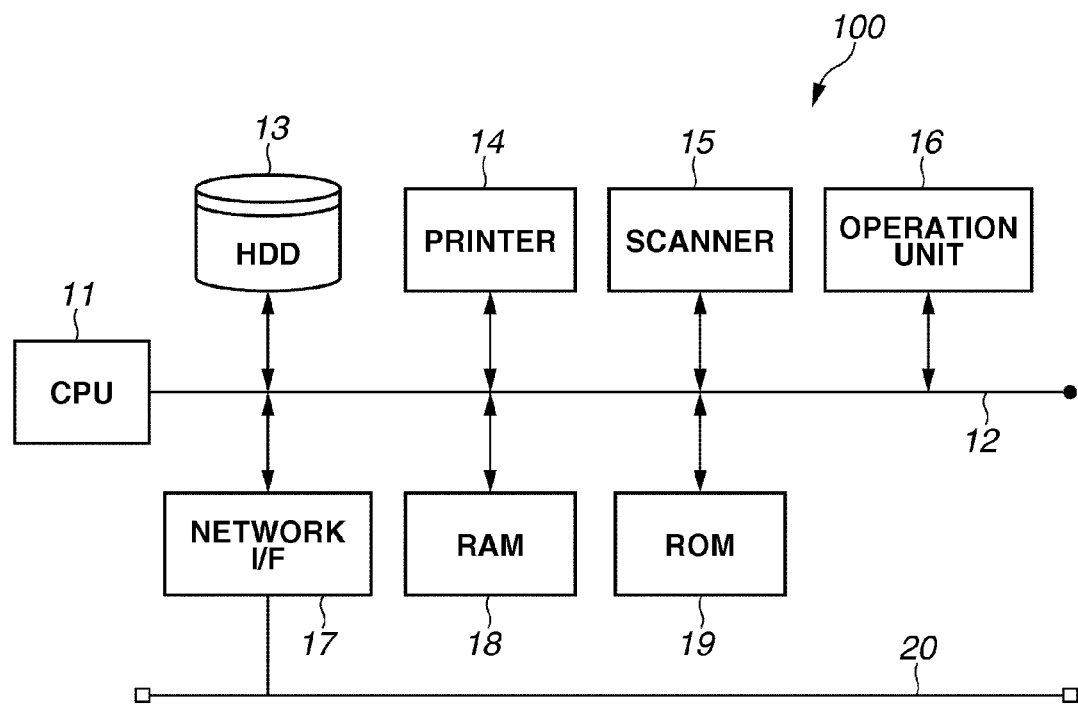
FIG. 1 is a block diagram illustrating a configuration of an image processing apparatus according to an exemplary embodiment of the present invention.

FIG. 1 is a block diagram illustrating a configuration of an image processing apparatus as an exemplary embodiment of the present invention. Although a multifunction peripheral including various functions such as a copy function and a scanner function is described as an example of an image processing apparatus 100 according to the present embodiment, a plurality of apparatuses having such functions as a whole may also be connected and used together as an exemplary embodiment of the present invention.

A central processing unit (CPU) 11 controls the entire operation of the image processing apparatus 100 by loading a program stored in a read-only memory (ROM) 19 into a random access memory (RAM) 18. Further, the CPU 11 communicates with each unit constituting the image processing apparatus 100 via a bus 12. An operation unit 16 includes a plurality of keys which a user manipulates when making instructions and a display unit which displays various types of information to be notified to the user. A scanner 15, which is a reading apparatus for reading an image of a document, scans an image included in a document set by the user on a document positioning plate, as a color image, and then stores electronic data (image data) obtained by the scanning in a hard disk drive (HDD) 13, the RAM 18, or the like.

The HDD 13 is a hard disk drive including a hard disk and is used for storing various types of information that is input. Further, the scanner 15 includes a document feeder. A plurality number of sheets set on the document feeder can be sequentially fed onto a document positioning plate and scanned. A printer 14 is a printing apparatus that prints an image of image data that is input, on a sheet of recording paper. A network I/F 17 connects the image processing apparatus 100 to a network 20 and controls reception of data sent from an external apparatus on the network and transmission of data to be sent to an external apparatus on the network.

According to the present embodiment, image data, which is used in the processing described below, is input via the scanner 15. However, image data of a document transmitted from an external apparatus via the network I/F 17 can also be processed according to the present embodiment in a similar manner. Further, image data of a document can be also processed according to the present embodiment in a similar manner by a personal computer (PC) to which a scanner or a printer is connected. In this case, the whole or a part of a program used in the present embodiment can be provided to the PC via a network or stored in a storage medium such as a compact disc read-only memory (CD-ROM) and provided to the PC.

Next, an example of a document used in the present embodiment will be described.

FIG. 2A illustrates an example of a form of a document which is used according to the present embodiment. The document is an invoice, and processing instruction information described below is not yet added to the form by the user. The invoice includes regions where a company name to which the invoice is to be sent, a person in charge of the company, project name, total amount, product name, quantity, unit, unit price, amount, bank for transfer, subtotal, tax such as consumption tax, and remarks are written, and also a region where a seal of an issuer is stamped. When the user officially issues this invoice, the user adds information including project name, product name, quantity, unit, unit price, amount, and seal of the person that prepared the invoice.

According to the present embodiment, a certain column of the invoice designated by the user is checked so as to determine whether information is added to the column, and further, whether another column designated by the user is blank.

FIG. 2B is an example of the document where an arbitrary region to be checked among the items included in the document illustrated in FIG. 2A is marked by the user using a color pen. The document illustrated in FIG. 2B will be the processing instruction sheet.

The processing instruction sheet is generated when the user who checks the information-added invoice adds processing instruction information, which is described below, to a sheet having the same format as the invoice to be checked. In other words, the processing instruction sheet is the invoice illustrated in FIG. 2A having the processing instruction information added to it. According to the present embodiment, the user marks a corresponding region using a color pen or the like and draws a rectangle so as to form a closed region and designate the region to be processed.

Now, the processing instruction information (additional information) will be described. In FIG. 2B, a region 31 is defined by a blue rectangle, a region 32 is defined by a green rectangle, and a region 33 is defined by a red rectangle. All of these rectangles are drawn by the user using a color pen. Colors other than those described above can also be used in defining the regions. Further, the number of the colors is not limited to three and it can be increased or reduced according to the check content. Furthermore, although a color pen is used according to the present embodiment, other writing instrument can also be used so long as it can add color to the sheet.

Before proceeding to the next step, the user stores the color which the user uses for the processing instruction information and the corresponding processing content in the RAM 18 using the operation unit 16. In other words, check points as to whether the region in the blue rectangle is blank, the region in the green rectangle includes information, and the region in the red rectangle includes a seal or a signature, are stored in the RAM 18. The CPU 11 determines a color component of each stored color (e.g., hue) and stores the result in the RAM 18.

Instead of registering the color via the operation unit 16 by the user, the color can also be registered using the scanner 15. In this case, the scanner scans what the user has written on the sheet. Further, instead of making the registration by the user, the registration can be stored in advance in the image processing apparatus 100. If the content stored in the image processing apparatus 100 is to be used, the user adds the processing instruction information to the document form according to the registered color and content.

In this way, the user registers the color component which is used as the processing instruction information and the processing content that corresponds to the color component, and then generates the processing instruction sheet according to the color component and the content. The image processing apparatus 100 extracts the processing instruction information from the generated processing instruction sheet and determines the processing content according to the extracted result. Then, the image processing apparatus 100 checks the document to be checked and determines whether a predetermined region includes information, another region does not include information, and another predetermined region is stamped.

FIG. 2C illustrates an example of a document to be checked according to the present embodiment. The form of the document to be checked is the same as those of the documents illustrated in FIGS. 2A and 2B.

According to the present embodiment, the processing instruction information, which is added as illustrated in FIG. 2B, is extracted. Then, using the extracted result, if no information is included in a region 41 (i.e., it is blank), if information is included in a region 42, and if a region 43 is stamped, the document to be checked is determined as a normal document.

Since the example in FIG. 2C is a document that satisfies all the conditions used in the determination, the document is determined as normal. If even one condition is determined as not satisfying, the document is determined as NG. The check content and the regions are not limited to those described above and different content or other regions can also be checked.

Next, the process for generating a scan ticket used for checking the content of the document based on the processing instruction sheet illustrated in FIG. 2B will be described.

According to the present embodiment, the scan ticket is a ticket that includes instruction content illustrated in FIG. 2B and includes a check method used for checking a document to be checked, such as the one illustrated in FIG. 2C. The ticket is represented in a form that is recognizable by the image processing apparatus 100 (e.g., QR code). The scan ticket includes the instruction content obtained from the document in FIG. 2B and also position information of the region to which the instruction is applied. When the image processing apparatus 100 checks the document to be checked, the scanner 15 scans the scan ticket and the CPU 11 recognizes the processing content from the scanned image.

FIG. 3 is a flowchart illustrating a flow of data processing used for generating a scan ticket according to the present embodiment. The flowchart is realized by the CPU 11 loading a program stored in the ROM 19 into the RAM 18 and executing it.

The flow in FIG. 3 starts when the user inputs an instruction for generating a scan ticket via the operation unit 16. In step S501, the CPU 11 instructs the operation unit 16 to display on the operation unit 16 the color of the processing instruction information stored in the RAM 18 and the combination of the processing content. For example, instructions such as "OK if a region in a red rectangle includes a stamp or a signature", "OK if a region in a blue rectangle is blank", and "OK if any description is in a region in a green rectangle" are displayed. The color of the processing instruction information is hereinafter referred to as an instruction color.

In step S502, the CPU 11 instructs the operation unit 16 to display a message asking the user whether the instruction color and the processing content displayed in step S501 are adequate.

If the CPU 11 determines that the user has determined that the color and the content are not adequate via the operation unit 16 (NO in step S502), then the process proceeds to step S505. In step S505, the CPU 11 instructs the operation unit 16 to display a notice that the instruction color or the processing content will be changed.

In step S505, a message asking the user whether a color is to be changed may be displayed. If such a message is displayed, the image processing apparatus 100 presents a new color or the user designates an arbitrary new color using the operation unit 16 in place of the color to be changed. Further, the change can be made by not designating a new color but simply changing the combination of the color and the processing content. At this time, since the CPU 11 cannot assign one color to different processing content, the CPU 11 makes control such that one color is assigned to a certain processing content.

When the instruction color or the processing content or both of them are changed in step S505, the process returns to step S501. In step S501, the CPU 11 instructs the operation unit 16 to display the combination of the instruction colors and the processing content again. The display made by the operation unit 16 is such that the user can confirm that the change has been made in step S505.

According to the inquiry in step S502, if the CPU 11 determines that the user has determined that the color and the content are adequate via the operation unit 16, the CPU 11 determines the instruction color and the processing content corresponding to the determined instruction color as the color and content to be used for the processing instruction information and stores them in the RAM 18.

The determination in step S502 is made so as to prevent extraction error of processing instruction information. Since the user visually confirms the content of the document (i.e., color included in the document), if the color component of the instruction color and the color component included in the document are similar, the user can change the instruction color so that they are different.

Further, as a result of the confirmation in step S502, if the color component included in the document and the color component of the instruction color are determined to be similar, a monochromatic copy of the document can be produced as described below. In this case, the CPU 11 instructs the operation unit 16 to display a message asking the user to set the document on the scanner 15. When the CPU 11 determines that the user sets the document, the CPU 11 instructs the scanner 15 to make a monochromatic copy of the document.

In such a way, the extraction error of the processing instruction information that may occur when the processing instruction information is added using a chromatic color pen can be prevented. Further, by determining whether the color component included in the document and the color component of the instruction color are different according to the user's confirmation, the number of times the document is scanned by the scanner can be reduced.

In step S502, if the CPU 11 determines that the instruction color and the processing content are adequate, then the color component used in the processing instruction information is identified and stored in the RAM 18. In step S503, the CPU 11 instructs the operation unit 16 to display a message asking whether the user has at hand only the document to be checked (e.g., FIG. 2C).

This is to confirm whether the user has a processing instruction sheet (e.g., FIG. 2B) or a template (e.g., FIG. 2A) used for generating a processing instruction sheet. In other words, according to this step, even if the user has only the document to be checked at hand, a template used for generating the processing instruction sheet can be generated from the document to be checked as described below. Here, the template is not a formal document to be checked, but a document to which the user can add processing instruction information by handwriting.

In step S503, if the CPU 11 determines that the user has only the document to be checked (i.e., no document to be used as a template) according to the response obtained via the operation unit 16 (YES in step S503), the process proceeds to step S504. In step S504, the CPU 11 instructs the operation unit 16 to display a message asking the user to set the document to be checked on the scanner 15.

For example, an instruction such as "Set one sheet of document to be checked on scanner. Select OK button when set." is displayed on the operation unit 16 and an OK button which is selected when the document is set is also displayed. According to the present embodiment, the CPU 11 recognizes that the document is set when the OK button is selected. However, whether the document is set on the scanner 15 can also be automatically recognized by a photo interrupter provided under the document positioning plate or a document sensor of the document feeder.

In step S505, if the CPU 11 determines that the document is set, the CPU 11 instructs the scanner 15 to scan the image of the document to be checked. In step S506, the CPU 11 converts the image data sent from the scanner 15 into monochromatic image data and sends the obtained monochromatic image data to the printer 14. Accordingly, a monochromatic copy is produced on a recording sheet by the printer 14.

Although a monochromatic copy of the document is output by the printer 14 in step S506, printing other than monochromatic printing may also be used in the present invention. For example, the color of the image of the scanned document can be converted into a color that is different from the instruction color and then printed. If a red character is included in the scanned document, it can be changed into a blue character and then printed. Further, a color to be converted can be registered in advance in the RAM 18. When a color same as the registered color is found in the scanned document, that color can be converted into a different color.

In step S507, the CPU 11 instructs the operation unit 16 to display a message asking the user to add the processing instruction information to the recording sheet output by the printer 14 in step S506.

On the other hand, in step S503, if the CPU 11 determines that the user has a template or a processing instruction sheet (NO in step S503), then the process proceeds to step S508. In step S508, the CPU 11 instructs the operation unit 16 to display a message that asks the user whether the processing instruction information is already included in the template.

According to this display, if the CPU 11 receives information from the user via the operation unit 16 that the instruction information is not included in the template (NO in step S508), then the process proceeds to step S509. In step S509, the CPU 11 instructs the operation unit 16 to display a message that encourages the user to set the template on the scanner 15.

Here, for example, an instruction such as "Set template on scanner. Select OK button when set." and an OK button are displayed on the operation unit 16. According to the present embodiment, the CPU 11 recognizes that the template is set when the OK button is selected. However, whether the template is set on the scanner 15 can also be automatically recognized by a photo interrupter provided under the document positioning plate or a document sensor of the document feeder.

When the CPU 11 recognizes that the template is set in step S509, the process proceeds to step S510. In step S510, the CPU 11 instructs the scanner 15 to scan the image of the document which is to be the template. In step S511, analysis/recognition processing of the image data obtained by the scanning is performed to determine whether a color having a color component same as the instruction color is included in the image.

The analysis/recognition processing of, for example, whether a red color is included in the document is realized by extracting a red hue and then performing the analysis/recognition processing. Various publicly known methods can be used in the analysis/recognition of the color component. Further, a parameter other than hue, or further, a combination of hue and a different parameter can also be used.

In step S512, the CPU 11 determines whether a color same as the instruction color stored in the RAM 18 is included in the color analyzed and recognized in step S511. The determination of whether the instruction color and the color analyzed/recognized in step S511 is the same, may not be dependent on a perfect match between the colors, but the colors can be determined as a same color if the difference is within a certain range. For example, if the color is represented in RGB values in 256 stages, by obtaining an RGB value of the analyzed/recognized color and an RGB value of the instruction color, and then comparing the RGB values, the colors may be determined as a same color if the difference between the RGB values is within 20 stages. Further, it is possible to use a determination method other than the above-described method in determining whether the colors are the same.

In step S512, if the CPU 11 determines that a color same as the instruction color stored in the RAM 18 is included in the image of the template (YES in step S512), then the process proceeds to step S513. In step S513, the CPU 11 instructs the operation unit 16 to display a message asking the user to set the template on the scanner 15.

Here, for example, an instruction such as "Set template on scanner. Select OK button when set." and an OK button are displayed on the operation unit 16. According to the present embodiment, the CPU 11 recognizes that the template is set when the OK button is selected. However, whether the template is set on the scanner 15 can also be automatically recognized by a photo interrupter provided under the document positioning plate or a document sensor of the document feeder.

When the CPU 11 recognizes that the template is set in step S513, the process proceeds to step S514. In step S514, the CPU 11 instructs the scanner 15 to scan the template. Then, the CPU 11 converts the image data output from the scanner 15 into monochromatic image data and sends the obtained monochromatic image data to the printer 14 so that the printer 14 can produce a monochromatic copy.

Although a monochromatic copy of the document is output by the printer 14 in step S514, printing other than monochromatic printing may also be used in the present invention. Various methods can be used in place of the above-described method as described in step S506.

In step S515, the CPU 11 instructs the operation unit 16 to display a message asking the user to add the processing instruction information, such as the one illustrated in FIG. 2B, to the recording sheet output by the printer 14 in step S514.

On the other hand, in step S512, if the CPU 11 determines that a color same as the instruction color stored in the RAM 18 is not included in the image of the template (NO in step S512), then the process proceeds to step S516. In step S516, the CPU 11 instructs the operation unit 16 to display a message asking the user to add the processing instruction information, such as the one illustrated in FIG. 2B, to the template.

In step S508, the CPU 11 instructs the operation unit 16 to display a message asking the user whether the processing instruction information is already added to the template. If the CPU 11 receives information from the user that the instruction information is already added to the template via the operation unit 16 (YES in step S508), then the process proceeds to step S517. In step S517, the CPU 11 instructs the scanner 15 to scan the image of the template including the processing instruction information.

In other words, the CPU 11 instructs the operation unit 16 to display a message asking the user to set the instruction processing sheet on the scanner 15. When the user sets the document (instruction processing sheet) on the scanner 15 and selects the OK button, the CPU 11 instructs the scanner 15 to scan the document. In this step, the CPU 11 does not convert the image data obtained from the scanner 15 into monochromatic image data. The obtained image data is stored in the RAM 18.

In step S518, the CPU 11 performs analysis/recognition processing of the processing instruction information using the image data obtained from the scanner 15. First, the CPU 11 analyzes an area where the one or a plurality of instruction colors determined in step S502 is included in the document. By recognizing the portion where the instruction color is found and the color of that portion, the CPU 11 identifies the position of the region to be processed for each color. The identified position can be used in determining the position and the size of the region to be processed in the document. For example, the position can be identified by coordinates. Then, the identified position and the processing content determined in step S502 area are associated with each other and stored in the RAM 18.

In step S519, the CPU 11 instructs the operation unit 16 to display the analysis/recognition result obtained in step S518. According to this instruction, for example, coordinates of the region corresponding to the identified processing instruction information and the processing content of that region are displayed. Further, a thumbnail image of the scanned document can be displayed. Then, the position of the processing instruction information and its processing content can be displayed identifiably vis-a-vis the thumbnail image.

In step S520, the CPU 11 instructs the operation unit 16 to display a message asking the user to confirm whether the content displayed in step S519 is correct.

In step S520, if the CPU 11 receives from the user via the operation unit 16 a response that the content is not correct (NO in step S520), then the process proceeds to step S525. In step S525, the CPU 11 instructs the operation unit 16 to display a message asking the user whether a monochromatic copy of the image of the document scanned by the scanner 15 in step S517 is to be produced by the printer 14.

If the CPU 11 receives from the user via the operation unit 16 a response that a monochromatic copy is to be produced (YES in step S525), the process proceeds to step S526. In step S526, the CPU 11 converts the image data of the document scanned by the scanner 15 into monochromatic image data and instructs the printer 14 to produce a monochromatic copy. This means that, if the processing instruction information is not correctly extracted, a monochromatic copy of the processing instruction sheet including the processing instruction information is produced. Then, the processing instruction information is added to the obtained monochromatic copy.

Although a monochromatic copy of the document is output by the printer 14 in step S526, printing other than monochromatic printing may also be used in the present invention. Various methods can be used in place of the above-described method as described in step S506.

In step S527, the CPU 11 instructs the operation unit 16 to display a message asking the user to add the processing instruction information to the recording sheet output by the printer 14 in step S526.

In step S525, if the CPU 11 receives from the user via the operation unit 16 an instruction that a monochromatic copy is not to be produced (NO in step S525), then the process proceeds to step S528. In step S528, the CPU 11 instructs the operation unit 16 to display a message asking the user to confirm whether a processing instruction sheet is to be newly generated.

If the CPU 11 receives an instruction from the user via the operation unit 16 that a processing instruction sheet is to be newly generated (YES in step S528), then the process proceeds to step S529. In step S529, the CPU 11 instructs the operation unit 16 to display a message asking the user to set the newly generated processing instruction sheet on the scanner 15. On the other hand, if the CPU 11 receives an instruction from the user via the operation unit 16 that an processing instruction sheet is not to be newly generated (NO in step S528), then the process ends.

When the display in step S527 or step S529 is performed, the process returns to returns to step S517. In step S517, the user sets the document on the scanner 15 and selects the OK button via the operation unit 16 to instruct scanning of the processing instruction sheet.

In step S520, if the CPU 11 receives a response from the user via the operation unit 16 that the analysis result is correct (YES in step S520), the CPU 11 stores the content of the analysis in the RAM 18 as an extraction result of the processing instruction information, and the process proceeds to step S521. In step S521, the CPU 11 instructs the operation unit 16 to display a message asking the user whether a scan ticket is to be generated. If the CPU 11 receives a response from the user via the operation unit 16 that the scan ticket is to be generated (YES in step S521), the CPU 11 encodes the analysis content.

The encoding of the analysis content means, for example, encoding the analysis result displayed in step S519 into a two-dimensional code (e.g., QR code). The content that is encoded is a region to which the processing instruction is applied, and the content of the processing of that region is also encoded. Further, although a two-dimensional code is used in the following example, a different method can be used in encoding the analysis result. In other words, any coding method can be used so long as the image processing apparatus 100 can analyze/recognize the generated code.

In step S523, the CPU 11 instructs the printer 14 to print what is encoded in step S522 as an image on a recording sheet. The obtained printed sheet is the scan ticket.

The printed scan ticket can be used in checking the document to be checked. However, if the analysis result is determined as correct in step S520, it means that the processing instruction sheet scanned by the scanner 15 in step S517 is correctly recognized. Thus, steps 521 to 523 can be omitted and the processing instruction sheet scanned in step S517 can be used as a scan ticket. In this case, the processing content is recognized at the time the processing instruction sheet is checked.

Further, according to the inquiry in step S521, if the CPU 11 receives from the user via the operation unit 16 a response that the scan ticket is not to be generated (NO in step S521), the CPU 11 instructs the operation unit 16 to display an ID used for identifying the analysis content stored in step S520. This ID is used for identifying the analysis content when checking the document to be checked and reading out the analysis content from the RAM 18. The ID can be presented by the CPU 11 but the user can also designate a desirable ID via the operation unit 16. The determined ID and the analysis content are associated to each other and stored in the RAM 18. Then, the process proceeds to step S524.

In step S524, the document to be checked is checked according to the processing instruction information recognized as described above and the corresponding processing content. Details of the processing will be described below.

According to the above-described processing, a color component included in a document is converted if it is similar to that of the instruction color, and then printed. Then, the user adds the processing instruction information to the obtained print. Since the color component included in the document is different from the instruction color, the processing instruction information added to the processing instruction sheet can be correctly recognized. Accordingly, the number of recognition errors of the processing instruction information can be reduced. Further, since necessary operations can be appropriately instructed to the user (e.g., asking the user to produce a monochromatic copy), the possibility of operation errors can be reduced. Not all of the processing described referring to the above-described flowchart is necessarily performed, and some of the processing can be omitted.

Next, the checking procedure referred to in step S524 will be described in detail. The checking procedure is performed using the scan ticket generated as described above and according to the extracted processing instruction information.

Figure 4:
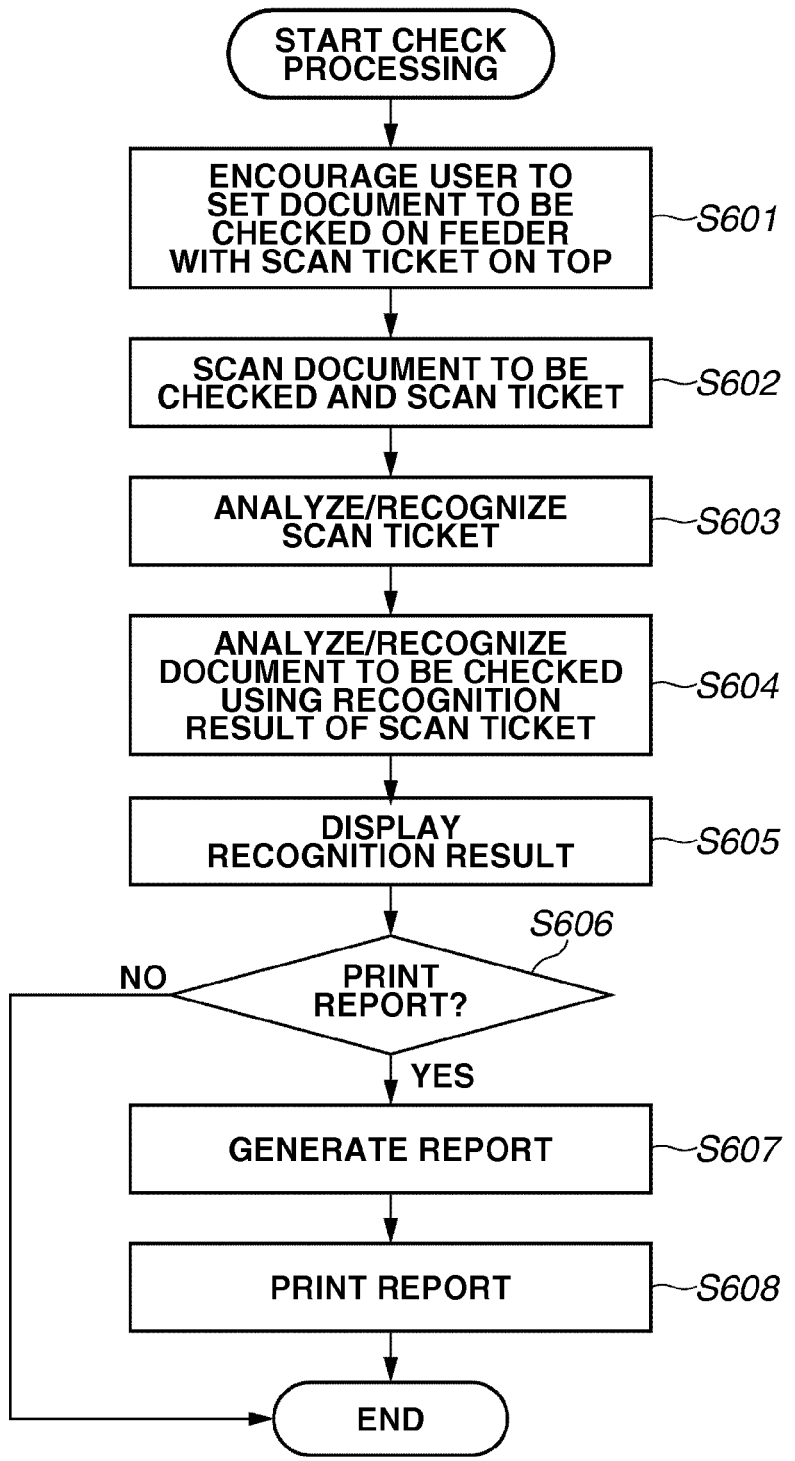
FIG. 4 is a flowchart illustrating a checking process of a document using the scan ticket according to the present embodiment.

FIG. 4 is a flowchart illustrating a flow of data processing used for checking the document to be checked using the scan ticket. The flowchart illustrates a flow of processing when the CPU 11 loads a program stored in the ROM 19 into the RAM 18 and executes it. This flow is executed when the generation of a scan ticket is instructed in step S521 in FIG. 3.

When the user gives the instruction for checking the document to be checked via the operation unit 16, the flow is started. In step S601, the CPU 11 instructs the operation unit 16 to display a message asking the user to set the documents to be checked on the document feeder and set the scan ticket printed in step S523 on its top.

In step S602, when the scanning of the documents is instructed by the user selecting the OK button of the operation unit 16 after the documents are set, the CPU 11 instructs the scanner 15 to start scanning the documents by sequentially feeding the documents set on the document feeder.

First, the scan ticket, which is the first sheet of all the documents set on the document feeder, is fed to the scanner 15 and is scanned by the scanner 15. Subsequently, the documents to be checked set under the scan ticket are sequentially scanned. A plurality of documents to be checked can be set on the document feeder. Further, a great number of documents can be divided into a plurality of stacks and each stack can be set on the document feeder separately and processed if it is designated via the operation unit 16 that the documents belong to the same set of documents.

In step S603, the CPU 11 performs the analysis/recognition processing of the image of the first sheet scanned in step S602, in other words, the scan ticket. According to the present embodiment, a two-dimensional code included in the scanned scan ticket is analyzed and the region (position) to be processed and the processing content are recognized. The recognition result is stored in the RAM 18.

In step S604, the CPU 11 performs the analysis/recognition processing of the second and later documents to be checked using the recognition result stored in the RAM 18. For example, if the second and later sheets are as illustrated in FIG. 2C, the CPU 11 recognizes that the documents are normal when a region 41 is blank, a region 42 includes information, and a region 43 includes a seal or a signature.

In making the recognition, for example, the image in the region 41 is binarized according to a predetermined threshold value. If white pixels (no image) cover 80% or more of the area, the region is recognized as a blank region. Further, the image in the region 42 is also binarized according to a predetermined threshold value. If black pixels (image exists) cover 20% or more of the area, the region is determined to include information. Furthermore, if hue of red or a color similar to red is extracted from the image in the region 43, then it is binarized. If pixels cover 20% or more of the area, then the region is determined to include a seal or a signature. The above-described ratio is merely an example and a different ratio can also be used. Further, a different recognition method can also be used.

The CPU 11 sequentially stores the page number of the documents to be checked and the recognition result corresponding to the each page number in the RAM 18. If the recognition result of all the sheets is normal, then the CPU 11 determines that the recognition result of the documents is OK. If the recognition result of any one sheet is determined as not normal, then the CPU 11 determines that the recognition result of the documents is NG.

When the recognition processing of all the documents to be checked is completed, the CPU 11 sums up the results with respect to the documents stored in the RAM 18. By summing up the results, for example, a total number of the checked target documents, a number of regions determined as NG, and a page number of the document that includes the region determined as NG are obtained. The first sheet of the documents to be checked excluding the scan ticket in the order of the sheets scanned by the scanner 15 (the order the sheets are fed from the document feeder) is determined as the first page.

Further identifiable information stored in the RAM 18 other than the information described above can be included in the summing. While the results are stored in the RAM 18 according to the present embodiment, it can also be stored in the HDD 13.

In step S605, the CPU 11 instructs the operation unit 16 to display the result of the summing performed in step S604.

FIGS. 5A to 5D illustrate examples of the result of the summing displayed on the operation unit 16. FIG. 5A illustrates an example of the display screen where all the documents to be checked are determined as normal. In FIG. 5A, the total number of the documents to be checked is 100, the number of the NG regions is 0, the total number of the NG pages is 0, and no page number is displayed as the NG page. Further, the display screen illustrated in FIG. 5A includes an OK button used for closing the screen and a report print button used for printing the report.

FIG. 5B illustrates an example of the display screen where an NG page is included in the documents to be checked.

In FIG. 5B, the total number of the documents to be checked is 100, the number of the NG regions is 3, the total number of the NG pages is 2, and the page number of the NG page is 30 and 50. Further, in addition to the OK button and the report print button, the display screen includes an NG page display button which is used for displaying the NG page. When the NG page display button is selected, the screen changes to that illustrated in FIG. 5C.

FIG. 5C is a thumbnail image of the 30th page of the documents to be checked which turn out to be the NG page. Since the 50th page is also an NG page, the NG page number is displayed as ½ so as to indicate that the displayed page is the first of the two NG pages. Additionally, the display screen includes a "forward" button which is selected when the next NG page is to be displayed. If a "back" button is selected when the thumbnail image of the 50th page is displayed, the thumbnail image of the 30th page is displayed again.

In step S606, the CPU 11 instructs the operation unit 16 to display a message asking the user whether the report is to be printed. If the CPU 11 determines that the user has not instructed printing of the report (NO in step S606), then the process ends. If the CPU 11 determines that the user has instructed printing of the report (YES in step S606), the process proceeds to step S607. In step S607, if the report print button is selected when the screen illustrated in FIG. 5A or 5C is displayed, the CPU 11 generates a report showing the result of the above-described result. Since the printer 14 can print a greater area on the recording sheet compared to what is displayed by the operation unit 16, additional information can be added to the report compared to the screen displayed in step S605. For example, in addition to the result of the summing described above, a reduced image of the template of the document to be checked may be displayed at the same time.

In step S608, the CPU 11 instructs the printer 14 to print the generated report on a recording sheet. Further, at this time, a page that is determined as an NG page can have information that indicates that the page is an NG page. This information is added to the sheet when the report is printed.

FIGS. 6A and 6B illustrate examples of a page determined as an NG page and printed by the printer 14.

FIG. 6A is an example where a character string, which indicates that a page is an NG page, is added to the image data obtained by scanning the NG page with the scanner 15 in step S602, and is printed. According to the obtained print, the user can easily see which page is the NG page.

Further, FIG. 6B is an example where, in addition to the character string that indicates that the page is an NG page illustrated in FIG. 6A, the NG region of the NG page is marked by a rectangle of a predetermined color and information that it is the NG region is also added. Accordingly, the NG region in the page can be more easily recognized.

These are only examples and various types of information including a ground for NG as to the NG page can be added to the page when the NG page is printed. Further, the image data obtained by scanning the NG page may be printed as it is on one side of the sheet and the image illustrated in FIG. 6A or 6B can be printed on the other side using two-sided printing. Furthermore, in place of two-sided printing, the size of the original image and the original image with the information indicating that the page is an NG page may be reduced so that they can be arranged on one sheet and printed.

Furthermore, the NG page is not necessarily printed on one recording sheet. For example, depending on a total number of NG pages, images of a plurality number of NG pages can be reduced, arranged on one recording sheet, and then printed, or a predetermined number of the reduced images can be arranged on a sheet and printed. Additionally, the layout of the print can be determined depending on whether the number of the NG pages is an even number or an odd number. Various methods can be employed in printing the NG pages.

The printing method and the print layout of the NG pages can be designated by the operation unit 16 and stored in the RAM 18 in advance.

Although the scan ticket is used in the check processing in the present embodiment, the processing instruction sheet can be used as it is in place of the scan ticket as described above.

Next, a procedure for checking a document without using a scan ticket will be described.

Figure 7:
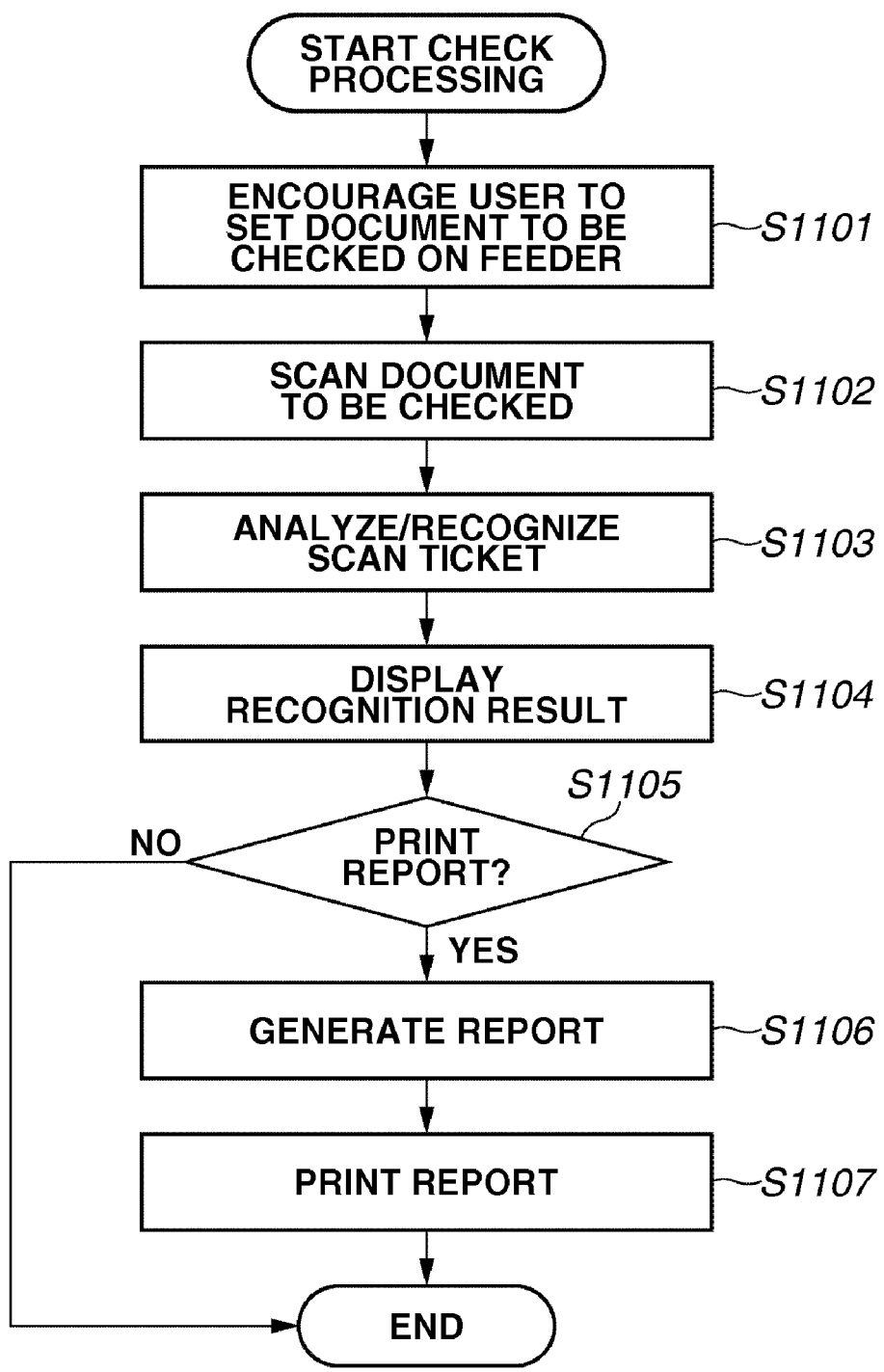
FIG. 7 is a flowchart illustrating a document checking process performed without using a scan ticket according to the present embodiment.

FIG. 7 is a flowchart illustrating a flow of data processing used for checking the document to be checked without using the scan ticket. The flowchart is realized by the CPU 11 loading a program stored in the ROM 19 into the RAM 18 and executing it.

The flowchart illustrates the processing executed in step S524 in FIG. 3 when the user inputs an instruction via the operation unit 16 that the generation of the scan ticket is not performed in step S521.

The process starts when the user inputs an instruction via the operation unit 16 that the document to be checked will be checked without using the scan ticket. In step 1001, the CPU 11 instructs the operation unit 16 to display a message asking the user to designate an ID used for reading out the result of analysis of the registered processing instruction information from the RAM 18. When the user enters the ID, the registered analysis result is identified. Next, the CPU 11 instructs the operation unit 16 to display a message asking the user to set the document to be checked on the document feeder.

In step 1002, when the document is set, the OK button on the operation unit 16 is selected, and the scanning of the document is instructed, the CPU 11 instructs the scanner 15 to sequentially feed the documents set on the document feeder and scan them.

In step 1003, the CPU 11 performs the analysis/recognition processing of the document to be checked using the analysis result of the processing instruction information (region or position to be processed and processing content) corresponding to the ID designated by the user.

Since processes after step S1003 are almost the same as those described referring to FIG. 4 except that the processing content is not recognized according to the scan ticket but to the processing content that corresponds to the ID registered in the RAM 18, the description of the processes will be omitted.

According to the above-described exemplary embodiment, the color of the instruction information is analyzed and recognized. In addition to determination based on the analysis/recognition of the color, the determination accuracy can be furthermore improved by determining whether the colored portion is rectangular. For example, after a blue portion is recognized, whether the blue portion is rectangular (closed region) is analyzed. As an analysis method of a closed region, the contour of the image formed by the blue color is traced. Then, from the obtained contour, the vertex (corner) pixels are detected. According to such pixels, whether the blue portion is rectangular can be determined. The determination method of the shape is not limited to the method described above and a publicly-known method can also be used.

Further, whether a region is the processing instruction region, can be determined according to whether the area of the rectangle region is larger or smaller than a predetermined size. For example, if the pixel number of the rectangular region is more than 128 pixels high and 128 pixels wide, then it can be determined as the processing instruction region. If the processing instruction region can be determined according to the size of the rectangular region, other methods can also be used. For example, even if a color same as the instruction color is included in a template as a character, the instruction information can be determined without outputting a monochromatic copy.

According to the above description, if a color same as the instruction color of the processing instruction information is included in a document, the image of the document is converted into a monochromatic image or the color in the document is changed to a color other than the instruction color. However, if a chromatic color is determined to be included in a document, the document image can be converted into a monochromatic image or an image using a color other than the instruction color.

In this case, whether the chromatic color is included can be determined by the scanner 15 scanning the document as is described above or by a response to an inquiry made and displayed concerning the content of the document on the operation unit 16. If a document is determined to include a chromatic color, then it will not be necessary to compare the instruction color and the color of the document and, accordingly, the load of the CPU 11 can be reduced.

Further, the instruction information can also be identified by using various methods or by a combination of various methods.

As described above, according to the present embodiment, by the user designating an arbitrary region in a document that is a template, by handwriting using a color pen, check content of a desired document can be instructed, and usability is improved. Further, the check result (e.g., predetermined information is included in a predetermined region and predetermined information is not included in a different predetermined region) which the user desires can be appropriately summed up. The obtained result is displayed on an operation unit or printed on a recording sheet so that the user can easily comprehend the result. In other words, since the desired summing-up is automatically performed and the page and the region determined as NG can be easily identified, it contributes to saving the user's time.

According to the present invention, whether a predetermined region of a document includes information and another predetermined region does not include information can be easily checked.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-056316 filed Mar. 10, 2009, which is hereby incorporated by reference herein in its entirety.

What is claimed is:

1. An image processing apparatus, comprising:
a first registration unit configured to register position information of a first region of a document and determined as normal if information is recorded;
a second registration unit configured to register position information of a second region of the document and determined as normal if information is not recorded;
an input unit configured to input image data obtained by controlling a reading unit to read an image of the document;
an identification unit configured to identify a region corresponding to the position information registered by the first registration unit or the position information registered by the second registration unit from the image data input by the input unit;
a determination unit configured to determine whether information is recorded in the region identified by the identification unit; and
an output unit configured to output a result indicating that information is recorded in the first region or information is not recorded in the second region according to the determination by the determination unit.

2. The image processing apparatus according to claim 1, wherein the image data input by the input unit contains additional information for identifying the first region, and
wherein the first registration unit registers position information of the first region by extracting the additional information from the input image data.

3. The image processing apparatus according to claim 2, wherein the image data input by the input unit contains additional information for identifying the second region, and
wherein the second registration unit registers position information of the second region by extracting the additional information from the input image data.

4. The image processing apparatus according to claim 3, wherein the second registration unit determines that the additional information corresponds to the second region by a color component of the extracted additional information.

5. The image processing apparatus according to claim 2, wherein the first registration unit determines that the additional information corresponds to the first region by a color component of the extracted additional information.

6. The image processing apparatus according to claim 1, wherein the input unit sequentially reads a plurality of images of a plurality of documents sequentially fed from a document feeding device, and wherein the output unit outputs the result in association with an order of the plurality of documents fed from the document feeding device.

7. The image processing apparatus according to claim 1, wherein when information is not recorded in the first region or information is recorded in the second region, the output unit outputs the image data input by the input unit.

8. The image processing apparatus according to claim 1, wherein when information is not recorded in the first region or information is recorded in the second region, the output unit outputs the image data input by the input unit by adding to the information that enables identification of the first region where information is not recorded or the second region where information is recorded.

9. A data processing method executed on an image processing apparatus for processing image data obtained by reading an image of a document, the method comprising:
registering position information of a first region of a document and determined as normal if information is recorded;
registering position information of a second region of the document and determined as normal if information is not recorded;
inputting image data obtained by reading an image of the document;
identifying a region corresponding to the registered position information of the first region or the registered position information of the second region from the input image data;
determining whether information is recorded in the identified region; and
outputting a result indicating that information is recorded in the first region or information is not recorded in the second region according to the result of the determining step.

10. A computer-readable storage medium storing a program for causing a computer to execute the data processing method according to claim 9.

* * * * *